United States Patent
Lavery et al.

(10) Patent No.: US 6,551,390 B1
(45) Date of Patent: Apr. 22, 2003

(54) COMPOSITION CONTAINING TWO DIFFERENT DISAZODYESTUFFS USEFUL FOR INK JET RECORDING

(75) Inventors: Aidan Joseph Lavery, Buckinghamshire (GB); Janette Watkinson, Manchester (GB); Paul Francis Mahon, Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/806,170
(22) PCT Filed: Sep. 20, 1999
(86) PCT No.: PCT/GB99/03122
§ 371 (c)(1), (2), (4) Date: Jun. 22, 2001
(87) PCT Pub. No.: WO00/20513
PCT Pub. Date: Apr. 13, 2000

(30) Foreign Application Priority Data

Oct. 1, 1998 (GB) .............................................. 9821296

(51) Int. Cl.$^7$ .......................... C09D 11/00; B05D 1/26; B32B 3/00; B32B 27/14
(52) U.S. Cl. ................ 106/31.48; 106/31.52; 8/641; 427/466; 428/495
(58) Field of Search ........................ 106/31.48, 31.52; 8/641; 427/466; 428/195

(56) References Cited

U.S. PATENT DOCUMENTS

| | | | |
|---|---|---|---|
| 5,622,550 A | * 4/1997 | Konishi et al. | 106/31.48 |
| 5,749,951 A | * 5/1998 | Yoshiike et al. | 106/31.27 |
| 5,948,154 A | * 9/1999 | Hayashi et al. | 106/31.48 |
| 6,454,844 B1 | * 9/2002 | Kanaya | 106/31.48 |

FOREIGN PATENT DOCUMENTS

| | | |
|---|---|---|
| EP | 0 468 647 | 1/1992 |
| EP | 0 588 316 | 3/1994 |
| EP | 0 802 246 | 10/1997 |

* cited by examiner

Primary Examiner—Helene Klemanski
(74) Attorney, Agent, or Firm—Pillsbury Winthrop LLP

(57) ABSTRACT

Compositions comprising
(a) a dye of the Formula (1) or a salt thereof; and
(b) a dye of the Formula (2) or a salt thereof:

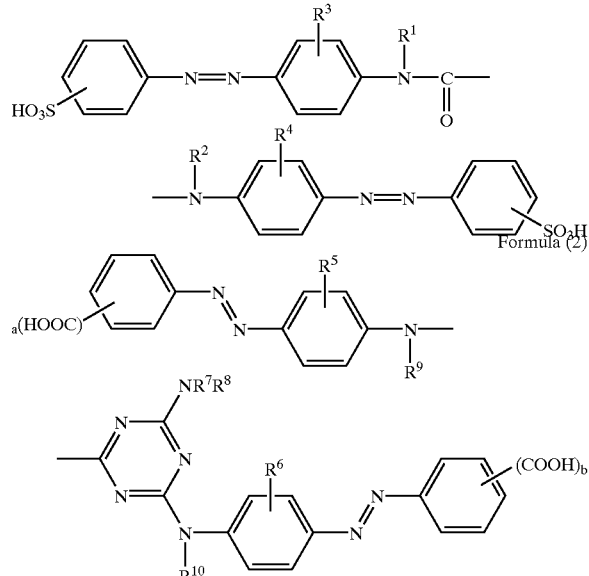

Figure 1:
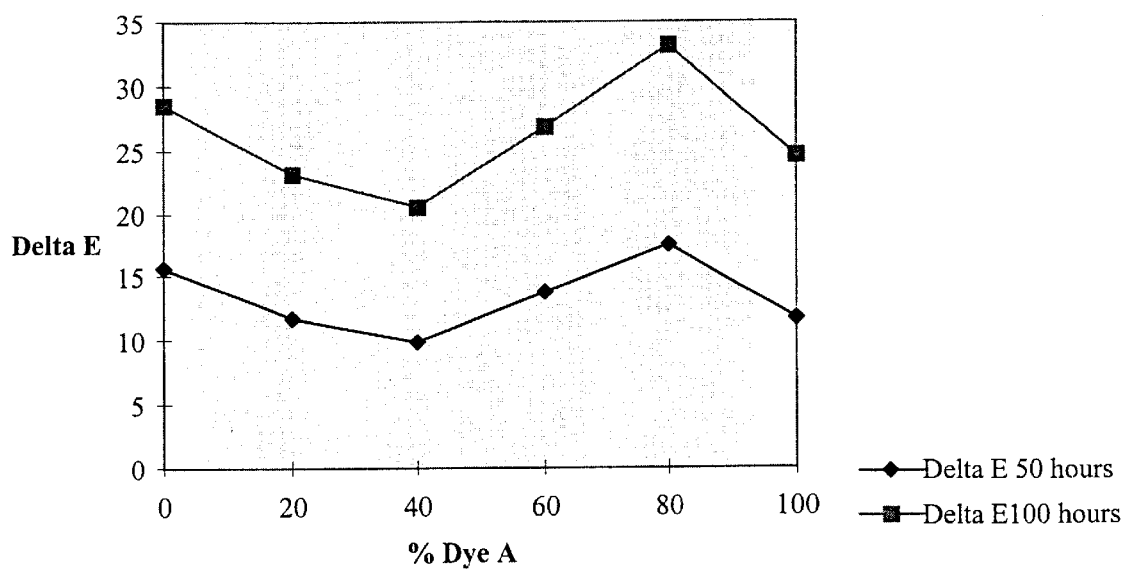

wherein $R^1$ to $R^{10}$, a and b are as defined in the description. Also claimed are liquid compositions and inks containing the dyes, an ink jet printing process using the inks, an ink jet printer cartridge containing the ink and an ink jet printer containing the cartridge.

15 Claims, 1 Drawing Sheet

COMPOSITION CONTAINING TWO DIFFERENT DISAZODYESTUFFS USEFUL FOR INK JET RECORDING

This application is the National Phase of International Application PCT/GB99/03122 filed Sep. 20, 1999 which designated the U.S. and that International Application was published under PCT Article 21(2) in English.

This invention relates to a composition comprising two or more yellow dyes, to liquid compositions and inks containing the dyes and to processes using said inks in printing and imaging technologies, especially ink jet printing.

Ink jet printing is a non-impact printing technique which involves ejecting, thermally or by action of an oscillating piezo crystal, droplets of ink continuously or on demand from a fine nozzle directly onto a substrate. The inks used in an ink jet printer are required to meet a number of criteria. For example they desirably provide sharp, non-feathered images which have good water-fastness, optical density and light-fastness. A high light-fastness is particularly important for photo-realistic prints prepared by means of an ink jet printer to minimise fading of the print over time.

Furthermore, the inks used in ink jet printers are required to dry quickly when applied to a substrate, however, they must not dry or crust over in the ink jet head as this can result in clogging of the ink jet nozzle. The inks are also required to be storage stable for long periods of time without deterioration in the properties of the ink. It has proved difficult to obtain an ink which is acceptable in all of the above properties, because optimisation of one ink property often has a detrimental effect on another.

EP 468 647 A1 discloses yellow azo dyes which when incorporated into an ink provides prints which have an excellent water-fastness.

C.I. Direct Yellow 132 is known as a colorant for use in ink jet printing inks. U.S. Pat. No. 5,560,771 discloses a yellow ink containing C.I. Direct Yellow 86 and C.I. Direct Yellow 132 in a weight ratio of 1:3 to 3:1. The inks described in U.S. Pat. No. 5,560,771 are described as having a desirable shade and reduced nozzle clogging.

However, with the increasing popularity of using ink jet printers to produce photo-realistic prints there is a need for colorants having a high light-fastness. We have now found that mixtures of certain dyes are valuable as colorants for ink jet printing inks.

According to a first aspect of the present invention there is provided a composition comprising:
(a) a dye of the Formula (1) or a salt thereof; and
(b) a dye of the Formula (2) or a salt thereof:

Formula (1)

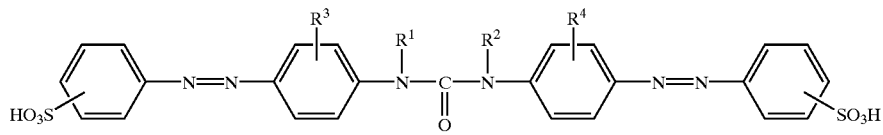

Formula (2)

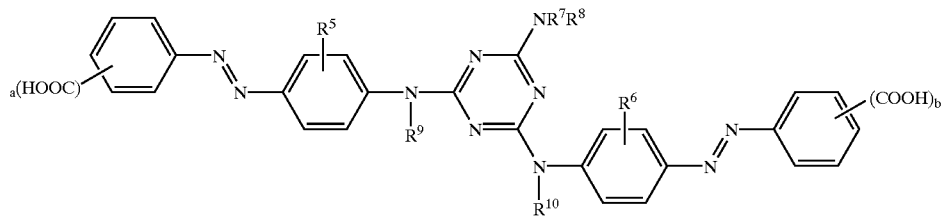

wherein:
$R^1$, $R^2$, $R^9$ and $R^{10}$ each independently is H or $C_{1-4}$-alkyl; and
$R^3$, $R^4$, $R^5$ and $R^6$ each independently is H, $C_{1-4}$-alkyl, $C_{1-4}$-hydroxyalkyl, $C_{1-4}$-alkoxy halo;
$R^7$ and RB each independently is H, $C_{1-4}$-alkyl, $C_{1-4}$-hydroxyalkyl, or $R^7$ and $R^8$ together with the nitrogen to which they are attached form a 5- or 6-membered ring; and
a and b each independently is 1 or 2. $R^1$, $R^2$, $R^5$, $R^6$, $R^9$ and $R^{10}$ are preferably H.

Preferably $R^3$ and $R^4$ are each independently $C_{1-4}$-alkoxy, more preferably methoxy.

Preferably $R^7$ and $R^8$ are each independently is $C_{1-4}$-hydroxyalkyl, or $R^7$ and $R^8$ together with the nitrogen to which they are attached form a piperazine ring or, more preferably, a morpholine ring.

Preferably the sulpho groups in Formula (1) are attached meta to each azo group.

Preferably each of a and b has a value of 2. More preferably a and b are each 2 and the —COOH groups are attached meta to each azo group in Formula (2).

A preferred composition according to the present invention comprises a dye of the Formula (3), or a salt thereof, and a dye of the Formula (4), or a salt thereof:

Formula (3)

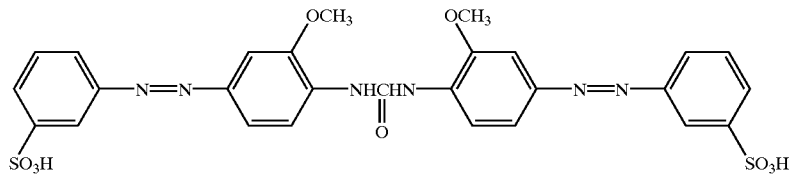

-continued

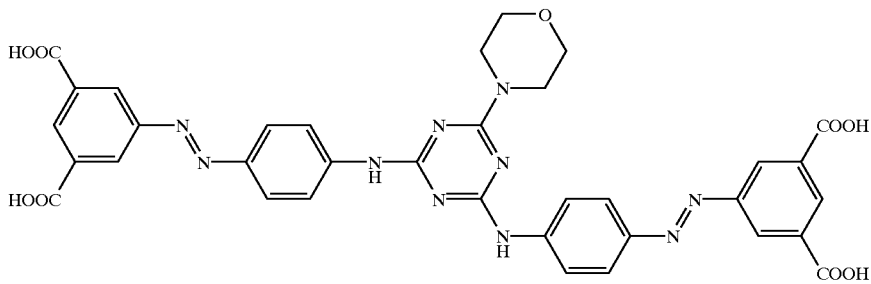

Formula (4)

Preferably the number of parts of component (a) is from 0.01 to 99.9, and the number of parts of component (b) is from 99.9 to 0.01; wherein the parts are by weight and the sum of the number of parts of component (a) and component (b)=100.

The compositions according to the first aspect of the invention exhibit a surprisingly high solubility in aqueous media compared to the individual dyes of the composition. Inks prepared using the compositions according to the present invention exhibit good operability when used in an ink jet printer. Furthermore, the inks provide prints with an attractive yellow shade, a high optical density and good water-fastness.

In a first preferred embodiment the composition comprises:
- from 1 to 60, preferably 15 to 55, more preferably 35 to 45 parts of component (a); and
- from 99 to 40, preferably 85 to 45, more preferably 65 to 55 parts of component (b);
- wherein all parts are by weight and the sum of the number of parts of component (a) and component (b)=100.

We have found that when the compositions according to this first preferred embodiment are incorporated into inks for use in an ink jet printer they provide prints which exhibit a surprisingly high light-fastness compared prints obtained using inks containing the individual dyes of the composition alone.

According to a second aspect of the present invention there is provided a composition comprising a composition according to the first aspect of the present invention and C.I. Acid Yellow 23, or a salt thereof.

The C.I. Acid Yellow 23 further enhances the solubility of the composition in aqueous media and provides prints which exhibit a high chroma, whilst maintaining the high light-fastness and good optical density exhibited by the compositions according to the first aspect of the invention.

Preferred compositions according to the second aspect of the invention comprise:
- (a) from 15 to 55, preferably 20 to 40 parts of a dye of the Formula (1) (more preferably of the Formula (3)), or a salt thereof;
- (b) from 45 to 85, preferably 40 to 60 parts of a dye of the Formula (2) (more preferably of the Formula (4)), or a salt thereof; and
- (c) from 5 to 40, preferably 10 to 20 parts of C.I. Acid Yellow 23, or a salt thereof;
- wherein all parts are by weight and the total number of parts (a)+(b)+(c)=100; and
  - the dyes of the Formulae (1) to (4) are as hereinbefore defined.

The dyes present in the compositions according to the first and second aspects of the present invention may be in free acid form but are preferably in the form of salt. Preferred salts are alkali metal salts, especially lithium, sodium and potassium salts or ammonium and substituted ammonium salts. Especially preferred salts are those formed with sodium, lithium, ammonia, volatile amines and mixed salts therewith. Especially preferred mixed salts are mixed lithium and sodium salts because they exhibit a particularly high aqueous solubility and good light-fastness.

The dyes may be converted to the desired salt form using conventional techniques. For example, a dye may be precipitated in its free acid form by adding an appropriate acid to an aqueous solution of the dye. The acid form of the dye may then be treated with a suitable base such as to yield the desired salt. Alternatively, ion exchange techniques can be used to convert the dyes to the desired salt forms.

The dyes in the compositions according to the first and second aspects of the present invention may be, and preferably are, purified to remove undesirable impurities before they are incorporated into inks for ink jet printing. Conventional techniques may be employed for purifying the dyes, for example ultra-filtration, reverse osmosis and/or dialysis.

The dye of Formula (1) may be prepared using conventional methods for the preparation of azo compounds, for example a suitable method comprises: coupling a diazotized sulphoaniline with a compound of the Formula (5):

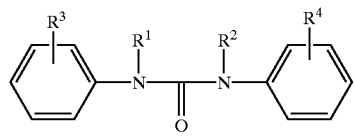

Formula (5)

wherein $R^1$, $R^2$, $R^3$ and $R^4$ are as hereinbefore defined.

The dye of Formula (3) is commercially available from a number of suppliers as C.I. Direct Yellow 132.

The dyes of the Formula (2) may be prepared using conventional techniques for the preparation of azo compounds, for example the method described in Example 10 of EP 468 647.

C.I. Acid Yellow 23 is commercially available from a number of sources including Zeneca Limited and Aldrich.

According to a third aspect of the present invention there is provided a liquid composition comprising a composition according to the first or second aspect of the present invention and a liquid medium.

A preferred liquid composition comprises:
- (i) 0.01 to 40 parts of a composition according to the first or second aspect of the present invention; and
- (ii) 99.99 to 60 parts a liquid medium;
  - wherein all parts are by weight and the number of parts (i)+(ii)=100.

The number of parts of component (i) is preferably from 0.1 to 30, more preferably 1 to 25 and especially from 2 to 15. Preferably the liquid medium comprises water, a mixture of water and one or more organic solvent(s), or an organic solvent.

When the liquid medium comprises water, a mixture of water and one or more organic solvent(s), or an organic solvent, it is preferred that component (i) is dissolved completely in the component (ii) to form a solution. Preferably the component (i) has a solubility of 10% or more in component (ii) because this allows the preparation of concentrates which may be used to prepare more dilute compositions and inks and to minimise the chance of precipitation of colorant if evaporation of the liquid medium occurs during storage.

When the liquid medium comprises a mixture of water and one or more organic solvent(s), the weight ratio of water to organic solvent(s) is preferably from 99:1 to 1:99, more preferably from 99:1 to 50:50 and especially from 95:5 to 80:20.

It is preferred that the organic solvent(s) present in the mixture of water and organic solvent(s) are water-miscible organic solvent(s). Preferred water-miscible organic solvent (s) are selected from $C_{1-6}$-alkanols, for example methanol, ethanol, n-propanol, isopropanol, n-butanol, sec-butanol, tert-butanol, isobutanol and n-pentanol; cyclic alkanols, for example cyclohexanol and cyclopentanol; diols, preferably diols with 2 to 12 carbon atoms, for example pentane-1,5-diol; amides, for example dimethylformamide or dimethylacetamide; ketones or ketone-alcohols, for example acetone, methyl ether ketone, cyclohexanone and diacetone alcohol; ethers, for example tetrahydrofuran or dioxane; oligo- or poly-alkylene-glycols, for example diethylene glycol, triethylene glycol, hexylene glycol, polyethylene glycol and polypropylene glycol; alkyleneglycols or thioglycols containing a $C_{2-6}$-alkylene group, for example ethylene glycol, propylene glycol, butylene glycol, pentylene glycol hexylene glycol and thiodiglycol; polyols, for example glycerol, pentan-1,5-diol and 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy)ethoxy]-ethanol, 2-[2-(2-ethoxyethoxy)-ethoxy]-ethanol, 2-(2-butoxyethoxy)ethanol and ethylene-glycol-monoallylether; cyclic amides, for example 2-pyrrolidone, N-methyl-2-pyrrolidone, N-ethyl-2-pyrrolidone, caprolactam and 1,3-dimethylimidazolidone; cyclic esters, for example caprolactone; sulphoxides, for example dimethyl sulphoxide and sulpholane or mixtures containing two or more, especially from 2 to 8, of the aforementioned water-miscible organic solvents, for example thiodiglycol and a second glycol or diethylene glycol and 2-pyrrolidone.

Especially preferred water-miscible organic solvents are 2-pyrrolidone;

N-methyl-pyrrolidone; alkylene- and oligo-alkylene-glycols, for example ethyleneglycol, diethyleneglycol, triethyleneglycol; and lower alkyl ethers of polyhydric alcohols, for example 2-methoxy-2-ethoxy-2-ethoxyethanol; and polyethyleneglycols with a molecular weight of up to 500.

The liquid compositions according to this aspect of the invention are particularly useful as an ink or a coloured concentrate which may be used to prepare an ink. When the liquid composition is used as a coloured concentrate to prepare an ink, the ink is preferably prepared by diluting the coloured concentrate with a suitable liquid medium, preferably one of the hereinbefore described liquid media. It is preferred however, that the liquid composition according to the third aspect of the invention is an ink, more preferably an ink jet printing ink.

Examples of further suitable ink media comprising a mixture of water and one or more organic solvent(s) are given in U.S. Pat. No. 4,963,189, U.S. Pat No. 4,703,113, U.S. Pat. No. 4,626,284 and EP 4,251,50A which are incorporated herein by reference thereto.

When the liquid medium comprises an organic solvent it preferably has a boiling point of from 0 to 300° C., more preferably of from 50 to 200° C. The organic solvent may be water-immiscible or water-miscible. Preferred water-miscible organic solvents are any of the hereinbefore mentioned water-miscible organic solvents. Preferred water-immiscible solvents include, for example, aliphatic hydrocarbons, esters, such as ethyl acetate, chlorinated hydrocarbons, such as $CH_2Cl_2$ and ethers, such as diethyl ether.

When the liquid medium comprises a water-immiscible organic solvent a polar solvent such as an alcohol, ester, ether or amide is preferably added to enhance the solubility of the dyes in the medium. It is especially preferred that when the liquid medium comprises an organic solvent, this is a ketones, especially methyl ethyl ketone or an alkanol especially ethanol and/or and n-propanol.

When the liquid medium is/or contains organic solvent, it may comprise a single organic solvent or a mixture of two or more organic solvents. It is preferred that the liquid medium comprises a mixture of 2 to 5 different organic solvents because this allows control to be exerted over the characteristics of the ink.

Inks in which the liquid medium is wholly or mainly an organic solvent are used where fast drying times are required and particularly when printing onto hydrophobic and non absorbent substrates such as plastics, metal or glass.

When the medium for the ink comprises a low melting point solid, the melting point of the solid is preferably in the range from 60° C. to 125° C. Suitable low melting point solids include long chain fatty acids or alcohols, preferably those with $C_{18-24}$ chains and sulphonamides. The composition according to the first aspect of the present invention may be dissolved or finely dispersed in the low melting point solid.

The liquid composition according to this aspect of the invention may contain other components conventionally used in ink jet printing inks, for example viscosity and surface tension modifiers, corrosion inhibitors, additives to reduce paper curl, additives to reduce colour to colour bleed, kogation reducing additives, and surfactants which may be ionic or non-ionic.

The pH of the ink is preferably from 5 to 12, more preferably 7 to 10.

The ink preferably has a viscosity at 25° C. of less than 30 cP.

When the liquid composition inks according to the third aspect of the invention is used as an ink jet printing ink, the ink preferably has a concentration of less than 500 parts per million of halide ions. Preferably the ink has less than 100 parts per million of di- and tri-valent metals. It is especially preferred that the ink contains less than 500, more preferably less than 100 parts per million and especially less than 50 parts per million, in total of halide ions and divalent and trivalent metals. This reduces nozzle blockage in ink jet printing heads, particularly in thermal ink jet printers. As will be clear, the term "parts per million" refers to parts by weight.

According to a fourth aspect of the present invention, there is provided a process for printing an image on a substrate comprising applying thereto by means of an ink jet printer an ink containing a composition according to the first or second aspect of the present invention.

The ink used in the process is preferably a liquid composition according to the third aspect of the present invention.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir having a small orifice by means of a resistor adjacent to the orifice, thereby causing the ink to be ejected through the orifice in the form of small droplets directed towards the substrate during relative movement between the substrate and the orifice.

The substrate used in the ink jet printing process is preferably paper, plastic, textile, metal or glass, more preferably paper, an overhead projector slide or a textile material, and especially paper.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper.

Preferred textile materials are natural, synthetic and semi-synthetic materials Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

According to a fifth aspect of the present invention, there is provided a paper, an overhead projector slide or a textile material printed with liquid composition according to the third aspect of the present invention, or by means of the process according to the fourth aspect of the present invention.

According to a sixth aspect of the present invention there is provided an ink jet printer cartridge comprising a chamber and ink, wherein the ink is present in the chamber and the ink contains a composition according to the first or second aspect of the present invention. Preferably the ink in the cartridge is a liquid composition according to the third aspect of the present invention.

According to a seventh aspect of the present invention there is provided an ink jet printer containing an ink jet printer cartridge, wherein the ink jet printer cartridge is as defined in the sixth aspect of the present invention.

The invention is further illustrated by the following examples wherein all parts and percentages are by weight unless otherwise stated.

In the Examples reference is made to FIG. 1 which illustrates the light-fastness exhibited by prints prepared by ink jet printing an ink containing a composition according to the present invention onto a paper substrate.

EXAMPLE 1

Dye A

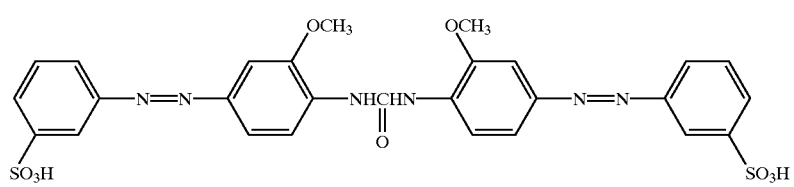

Dye (A)

Dye (A) is commercially available as CI Direct Yellow 132 from Zeneca Limited and a number of other sources.

Dye (B)

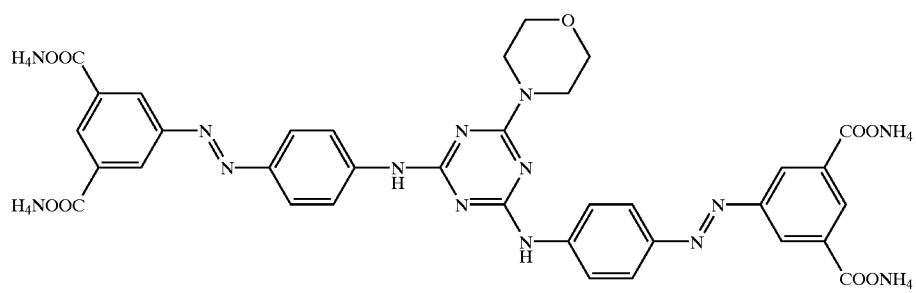

Dye (B)

Dye (B) was prepared using the process described in Example 10 of EP 468 647 A1.

Composition 1

A composition comprising a 1:1 mixture of Dye (A) and Dye (B) was prepared by mixing Dye (A) and Dye (B)

Solubility

The aqueous solubility of Composition (1), Dye (A) and Dye (B) at 20° C. and pH 9.5 is:

| Dye/Composition | Solubility (%) |
| --- | --- |
| Composition (1) | 23.1 |
| Dye (A) | 10.7 |
| Dye (B) | 15 |

The results clearly show that the mixture of Dye (A) and Dye (B) exhibit a higher aqueous solubility than Dye (A) alone or Dye (B) alone.

Inks

The inks shown in Table 1 were prepared by dissolving 3.5 parts in total of the dyes shown in Table 1 into 96.5 parts of an ink medium comprising 5 parts Urea, 5 parts Glycerol, 5 parts Ethylene Glycol, 4 parts Isopropanol and 81 parts water. The pH of each ink was adjusted to 9.5 using ammonia.

Ink Jet Printing

Each ink shown in Table 1 was applied to Xerox Acid paper using a Canon BJ 4300 ink jet printer.

After drying, each of the resulting prints was half covered and faded in an Atlas™ Ci35a Weatherometer. The light-fastness of the prints was then assessed by measuring the colour difference (ΔE) between the faded and unfaded portion of each print using an X-Rite™ 938 spectrodensitometer. The light-fastness of the prints on each paper type is shown in Table 1 under the column marked "ΔE", the time in brackets indicating the time the print was faded for in the weatherometer.

The ΔE value shown in Table 1 is a measure of the colour change resulting from exposure to light in the spectrodensitometer. Thus, the prints with a low ΔE value exhibit a high light-fastness because they did not fade significantly when exposed to light in the weatherometer.

TABLE 1

| Ink | Dye A (parts) | Dye B (parts) | ΔE (50 hours) | ΔE (100 hours) |
| --- | --- | --- | --- | --- |
| Ink 1 | 0.7 | 2.8 | 11.65 | 23.13 |
| Ink 2 | 1.4 | 2.1 | 9.91 | 20.41 |
| Ink 3 | 2.1 | 1.4 | 13.85 | 26.81 |
| Ink 4 | 2.8 | 0.7 | 17.59 | 33.23 |
| Comparative 1 | 3.5 | — | 11.81 | 24.49 |
| Comparative 2 | — | 3.5 | 15.59 | 28.41 |

FIG. 1 shows the light-fastness results. In FIG. 1 the X axis shows the % by weight of Dye A relative to the total weight of Dye A and Dye B. Thus 40% Dye A corresponds with Ink 2 which contained 1.4 parts of Dye A and 2.1 parts of Dye B.

FIG. 1 clearly shows the surprising improvement in light-fastness for prints obtained using inks containing a dye composition according to the first preferred embodiment of the first aspect of the present invention (i.e. inks containing up to 60% of Dye (A)), compared to those obtained using an ink containing Dye (A) alone and Dye (B) alone.

EXAMPLE 2

Further dye compositions may be prepared having the following ingredients and amounts shown in Table 2. The amounts quoted in Table 2 refer to the number of parts by weight of each component. Dye A and Dye B are as shown in Example 1. Dye (C) is C.I. Acid Yellow 23.

TABLE 2

| Composition No. | Dye A | Dye B | Dye (C) |
| --- | --- | --- | --- |
| 1 | 25 | 75 | 0 |
| 2 | 36 | 64 | 0 |
| 3 | 47 | 53 | 0 |
| 4 | 72 | 28 | 0 |
| 5 | 34 | 66 | 0 |
| 6 | 34.5 | 65.5 | 0 |
| 7 | 15 | 85 | 0 |
| 8 | 80 | 20 | 0 |
| 9 | 95 | 5 | 0 |
| 10 | 0.5 | 99.5 | 0 |
| 11 | 99 | 1 | 0 |
| 12 | 12 | 88 | 0 |
| 13 | 44 | 56 | 0 |
| 14 | 12.3 | 87.7 | 0 |
| 15 | 75.2 | 24.8 | 0 |
| 16 | 39.2 | 58.8 | 2 |
| 17 | 38 | 57 | 5 |
| 18 | 27 | 63 | 10 |
| 19 | 16.2 | 68.8 | 15 |
| 20 | 32.8 | 49.2 | 18 |
| 21 | 25.4 | 68.6 | 6 |

EXAMPLE 3

Inks 5 to 63 may be prepared having compositions described in Tables 3, 4 and 5 wherein the second column identifies the relevant dye composition from Table 2 in Example 2. The third column shows the amount of dye composition in the ink. All amounts are parts by weight. Thus, by way of example Ink (5) comprises:

(a) 2 parts of composition 1 in Table 2 (25 parts of Dye A and 75 parts Dye B);
(b) 80 parts water; and
(c) 5 parts propylene glycol.
(d) 6 parts N-methylpyrrolidone
(e) 4 parts pentane-1,5-diol; and
(f) 5 parts ethanolamine The inks may be applied to paper by thermal or piezo ink jet printing.

The following abbreviations are used in Tables 3, 4 and 5:

| | |
| --- | --- |
| PG = propylene glycol | DEG = diethylene glycol |
| NMP = N-methyl pyrrolidone | TFP = 2,2,3,3-tetrafluoropropanol |
| CYC = cyclohexanol | 2P = 2-pyrrolidone |
| P12 = propane-1,2-diol | UR = Urea |
| CET = cetyl ammonium bromide | PHO = Na$_2$HPO$_4$ and |
| TBT = tertiary butanol | TDG = thiodiglycol |
| GLY = glycerol | P-1,5 = Pentane-1,5-diol |
| H-1,6 = Hexane 1,6-diol | CAP = caprolactone |
| CAP-L = caprolactam | TEA = triethanolamine |
| EA = ethanolamine | BUT = γ-butyrolactone |

PEG 200 = Polyethylene glycol (average molecular weight of 200)

DEG-MBE = diethylene glycol monobutyl ether

TABLE 3

| Ink | Dye Composition | Dye Content | Water | PG | DEG | NMP | P-1,5 | TEA | CYC | BUT | CAP | EA | CAP-L |
|---|---|---|---|---|---|---|---|---|---|---|---|---|---|
| 5 | 1 | 2.0 | 80 | 5 | | 6 | 4 | | | | | 5 | |
| 6 | 3 | 3.0 | 90 | | 5 | 4.8 | | 0.2 | | | | | |
| 7 | 2 | 10.0 | 85 | 3 | | 3 | 3 | | | 5 | | 1 | |
| 8 | 4 | 2.1 | 91 | | 8 | | | | | | | | 1 |
| 9 | 5 | 3.1 | 86 | 5 | | | | | 0.2 | 4 | | | 4.8 |
| 10 | 6 | 1.1 | 81 | | | 9 | | 0.5 | 0.5 | | | 9 | |
| 11 | 7 | 2.5 | 60 | 4 | 15 | 3 | 3 | | | 6 | | 5 | 4 |
| 12 | 8 | 5 | 65 | | 20 | | 5 | | | 10 | | | |
| 13 | 9 | 2.4 | 75 | 5 | 4 | | 5 | | | | | 6 | 5 |
| 14 | 10 | 4.1 | 80 | 3 | 5 | 2 | 9.7 | | 0.3 | | | | |
| 15 | 11 | 3.2 | 65 | | 5 | 4 | 6 | | | 5 | 4 | 6 | 5 |
| 16 | 12 | 5.1 | 96 | | | | | | | | 4 | | |
| 17 | 13 | 10.8 | 90 | 5 | | | | | | 5 | | | |
| 18 | 14 | 10.0 | 80 | 2 | 6 | 2 | 5 | | | 1 | | 4 | |
| 19 | 15 | 1.8 | 80 | | 5 | | | | | | | 15 | |
| 20 | 1 | 2.6 | 84 | | | 11 | | | | | | 5 | |
| 21 | 7 | 3.3 | 80 | 2 | | | 10 | | | | 2 | | 6 |
| 22 | 9 | 12.0 | 90 | | | 7 | | 0.3 | | 2.7 | | | |
| 23 | 16 | 5.4 | 69 | 2 | 20 | 2 | 1 | | | | | 3 | 3 |

TABLE 4

| Ink | Dye Composition | Dye Content | Water | GLY | DEG | NMP | CET | TBT | TDG | UR | PHO | 2P | P12 |
|---|---|---|---|---|---|---|---|---|---|---|---|---|---|
| 24 | 17 | 3.0 | 80 | 15 | | | 0.2 | | | | | 4.8 | |
| 25 | 2 | 9.0 | 90 | | | 5 | | | | | 1.2 | | 5 |
| 26 | 3 | 1.5 | 85 | 3.8 | 5 | | 0.16 | 4.64 | 0.2 | | | | |
| 27 | 18 | 2.5 | 90 | | | 6 | 3.88 | | | | 0.12 | | |
| 28 | 21 | 3.1 | 82 | 4 | 8 | | 0.3 | | | | | | 5.7 |
| 29 | 19 | 0.9 | 85 | | | 10 | | | | 4.8 | 0.2 | | |
| 30 | 20 | 8.0 | 90 | | 4.7 | 5 | | | 0.3 | | | | |
| 31 | 8 | 4.0 | 70 | | | 10 | 4 | | | 1 | | 4 | 11 |
| 32 | 9 | 2.2 | 75 | 4 | 10 | 3 | | | | 2 | | 6 | |
| 33 | 10 | 10.0 | 91 | | | 6 | | | | | | 3 | |
| 34 | 12 | 9.0 | 76 | | 9 | 7 | | 2.05 | | | 0.95 | 5 | |
| 35 | 11 | 5.0 | 78 | 5 | 11 | | | | | | | 6 | |
| 36 | 14 | 5.4 | 86 | | | 7 | | | | | | 7 | |
| 37 | 2 | 2.1 | 70 | 5 | 5 | 5 | 0.1 | 0.2 | 0.1 | 5 | 0.1 | 9.5 | |
| 38 | 1 | 2.0 | 90 | | 10 | | | | | | | | |
| 39 | 13 | 2 | 88 | | | 2 | | | 10 | | | | |
| 40 | 16 | 5 | 78 | | | 5 | | | 12 | | | 5 | |
| 41 | 19 | 8 | 70 | 2 | | 8 | | | 15 | | | 5 | |
| 42 | 14 | 10 | 80 | | | | | | 8 | | | 12 | |
| 43 | 7 | 10 | 80 | | 10 | | | | | | | | |

TABLE 5

| Ink | Dye Composition | Dye Content | Water | PEG 200 | DEG-MBE | NMP | H-1,6 | TEA | TFP | BUT | CAP | EA | CAP-L |
|---|---|---|---|---|---|---|---|---|---|---|---|---|---|
| 44 | 1 | 2.0 | 80 | 5 | | 6 | 4 | | | | | 5 | |
| 45 | 2 | 3.0 | 90 | | 5 | 4.8 | | 0.2 | | | | | |
| 46 | 2 | 10.0 | 85 | 3 | | 3 | 3 | | | 5 | | 1 | |
| 47 | 4 | 2.1 | 91 | | 8 | | | | | | | | 1 |
| 48 | 5 | 3.1 | 86 | 5 | | | | | 0.2 | 3.8 | | | 5 |
| 49 | 6 | 1.1 | 81 | | | 9 | | 0.5 | 0.5 | | | 9 | |
| 50 | 7 | 2.5 | 60 | 4 | 15 | 3 | 3 | | | 6 | | 5 | 4 |
| 51 | 8 | 5 | 65 | | 20 | | | | | 10 | | | |
| 52 | 9 | 2.4 | 75 | 5 | 4 | | 5 | | | | | 6 | 5 |
| 53 | 10 | 4.1 | 80 | 3 | 5 | 2 | 9.7 | | 0.3 | | | | |
| 54 | 11 | 3.2 | 70 | | 5 | 4 | 6 | | | 5 | 4 | 6 | 5 |
| 55 | 12 | 5.1 | 96 | | | | | | | | 4 | | |
| 56 | 13 | 10.8 | 90 | 5 | | | | | | 5 | | | |
| 57 | 14 | 10.0 | 80 | 2 | 6 | 2 | 5 | | | 1 | | 4 | |
| 58 | 15 | 1.8 | 80 | | 5 | | | | | | | 15 | |
| 59 | 16 | 2.6 | 84 | | | 11 | | | | | | 5 | |

TABLE 5-continued

| Ink | Dye Composition | Dye Content | Water | PEG 200 | DEG-MBE | NMP | H-1,6 | TEA | TFP | BUT | CAP | EA | CAP-L |
|---|---|---|---|---|---|---|---|---|---|---|---|---|
| 60 | 17 | 3.3 | 80 | 2 | | | 10 | | | | 2 | | 6 |
| 61 | 18 | 12.0 | 90 | | | | 7 | 0.3 | | 2.8 | | | |
| 62 | 19 | 5.4 | 69 | 2 | 20 | 2 | 1 | | | | | 3 | 3 |
| 63 | 20 | 6.0 | 91 | | | 4 | | | | | | 5 | |

What is claimed is:

1. A composition comprising:
   (a) a dye of the Formula (1) or a salt thereof; and
   (b) a dye of the Formula (2) or a salt thereof:

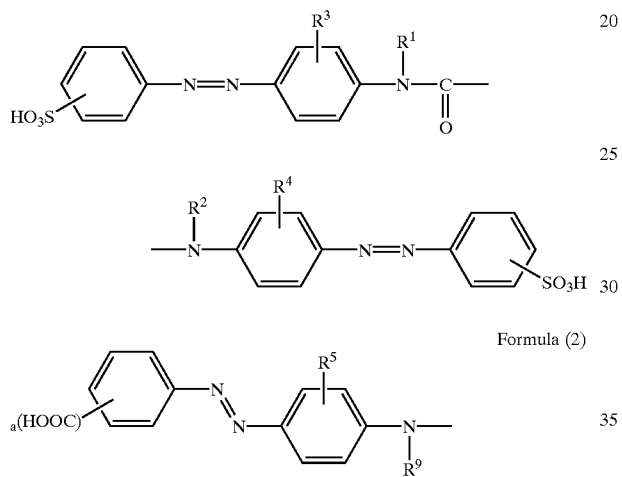

Formula (1)

Formula (2)

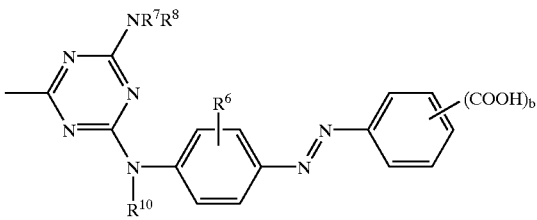

-continued wherein:
$R^1$, $R^2$, $R^9$ and $R^{10}$ each independently is H or $C_{1-4}$-alkyl; and
$R^3$, $R^4$, $R^5$ and $R^6$ each independently is H, $C_{1-4}$-alkyl, $C_{1-4}$-hydroxyalkyl, $C_{1-4}$-alkoxy or halo;
$R^7$ and $R^8$ together with the nitrogen to which they are attached form a 5- or 6-membered ring; and
a and b each independently is 1 or 2.

2. A composition according to claim 1 wherein $R^7$ and $R^8$, together with the nitrogen atom to which they are attached, form a piperazine or morpholine ring.

3. A composition according to either claim 1 or claim 2 wherein the dye of Formula (1) is of the Formula (3), or a salt thereof and the dye of Formula (2) is of the Formula (4), or a salt thereof:

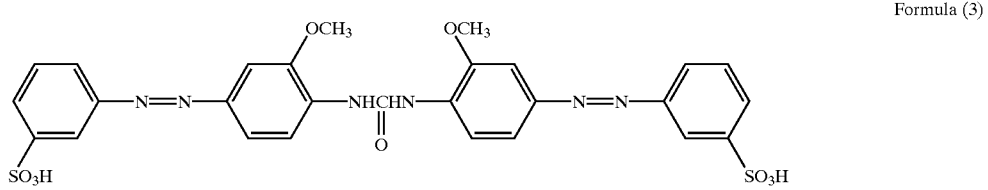

Formula (3)

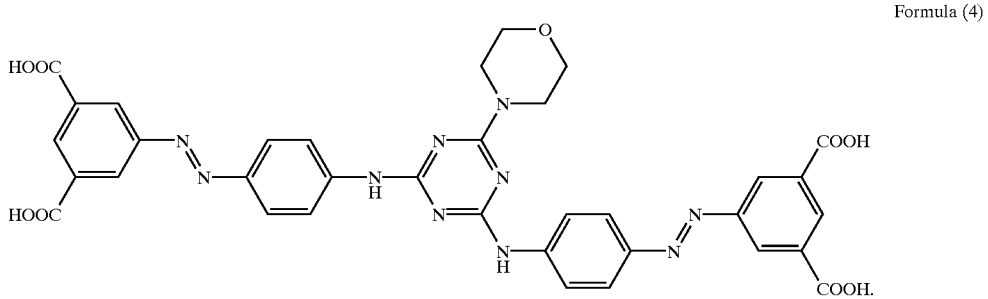

Formula (4)

4. A composition according to claim 1 comprising:

from 1 to 60 parts of component (a); and from 99 to 40 parts of component (b);

wherein all parts are by weight and the sum of the parts of component (a) and component (b)=100.

5. A composition according to claim 1 further comprising C.I. Acid Yellow 23 or a salt thereof.

6. A composition according to claim 1 wherein the dyes are in the form of a salt with sodium, lithium, ammonia and/or a volatile amine or a mixed salt therewith.

7. A liquid composition comprising a composition according to claim 1 and a liquid medium.

8. A liquid composition according to claim 7 wherein the liquid medium comprises a mixture of water and one or more organic solvent(s).

9. A liquid composition according to claim 7 or claim 8 which is an ink.

10. An ink according to claim 9 wherein the ink has a concentration of less than 100 parts per million in total of halide ions and divalent and trivalent metals.

11. A process for printing an image on a substrate comprising applying thereto by means of an ink jet printer an ink containing a composition according to claim 1.

12. A paper, an overhead projector slide or a textile material printed with a liquid composition according to claim 6.

13. An ink jet printer cartridge comprising a chamber and ink, wherein the ink is present in the chamber and the ink contains a composition according to claim 1.

14. An ink jet printer containing an ink jet printer cartridge, wherein the ink jet printer cartridge is as defined in claim 13.

15. A paper, an overhead projector slide or textile material printed by means of the process according to claim 11.

* * * * *